US011678687B2

United States Patent
Stordy

(10) Patent No.: US 11,678,687 B2
(45) Date of Patent: Jun. 20, 2023

(54) APPARATUS FOR ROASTING COFFEE BEANS

(71) Applicant: IKAWA Limited, London (GB)

(72) Inventor: Andrew Stordy, Wardhurst (GB)

(73) Assignee: IKAWA Limited, London (GB)

( * ) Notice: Subject to any disclaimer, the term of this patent is extended or adjusted under 35 U.S.C. 154(b) by 299 days.

(21) Appl. No.: 16/499,607

(22) PCT Filed: Jun. 7, 2018

(86) PCT No.: PCT/GB2018/000093
§ 371 (c)(1),
(2) Date: Sep. 30, 2019

(87) PCT Pub. No.: WO2018/185453
PCT Pub. Date: Oct. 11, 2018

(65) Prior Publication Data
US 2020/0100537 A1    Apr. 2, 2020

(30) Foreign Application Priority Data

Apr. 7, 2017 (GB) .................................... 1705694

(51) Int. Cl.
*A23N 12/12*    (2006.01)
*A23F 5/04*    (2006.01)
*A23N 12/08*    (2006.01)

(52) U.S. Cl.
CPC ............ *A23N 12/125* (2013.01); *A23F 5/046* (2013.01); *A23N 12/083* (2013.01); *A23V 2300/24* (2013.01)

(58) Field of Classification Search
CPC ....... A23F 5/046; A23N 12/08; A23N 12/083; A23N 12/125; A23V 2300/24

USPC ........... 99/286, 421 H, 467, 469, 483, 323.7, 99/468, 476; 34/63, 68, 95, 109, 196, 34/197, 211, 225, 233, 360, 576, 594, (Continued)

(56) References Cited

U.S. PATENT DOCUMENTS 4,494,314 A * 1/1985 Gell, Jr. .................. A23N 12/08
34/368
5,269,072 A * 12/1993 Waligorski ............. A23N 12/08
34/594

(Continued)

FOREIGN PATENT DOCUMENTS

EP          1034707 A1    9/2000

OTHER PUBLICATIONS

International Search Report and Written Opinion issued in PCT/GB2018/000093 dated Jul. 9, 2018, 10 pgs.

*Primary Examiner* — Nathaniel E Wiehe
*Assistant Examiner* — Ket D Dang
(74) *Attorney, Agent, or Firm* — Finch & Maloney PLLC

(57) ABSTRACT

Apparatus for roasting coffee beans, the apparatus comprising: a casing that defines an internal void, a baffle for dividing the internal void into first and second zones that are in fluid communication with one another; a heater for heating air to temperatures suitable for roasting coffee beans, the heater being located in the second zone; a control system for controlling the apparatus; the control system being located in the first zone; and a fan operable to draw ambient air into the first zone and drive the air from the first zone past the baffle into the second zone for heating by the heater, the arrangement being such that in use the first zone is cooler than the second zone.

11 Claims, 3 Drawing Sheets

(58) Field of Classification Search
USPC .......... 34/394, 494, 368, 606, 589; 426/466, 426/467, 494
See application file for complete search history.

(56) References Cited

U.S. PATENT DOCUMENTS

| | | | | |
|---|---|---|---|---|
| 5,345,923 | A | * | 9/1994 | Luebke .................. A21B 1/245 |
| | | | | 126/21 A |
| 5,500,237 | A | | 3/1996 | Gell, Jr. et al. |
| 5,638,607 | A | * | 6/1997 | Lemme .................. A23N 12/10 |
| | | | | 219/385 |
| 5,960,561 | A | | 10/1999 | Parodi et al. |
| 5,996,480 | A | | 12/1999 | Kelley et al. |
| 6,198,076 | B1 | * | 3/2001 | Moen .................... F24C 15/322 |
| | | | | 219/400 |
| 6,770,315 | B2 | * | 8/2004 | Moon .................... A23N 12/08 |
| | | | | 34/360 |
| 6,987,250 | B2 | * | 1/2006 | Levy .................. H05K 7/20209 |
| | | | | 219/508 |
| 2003/0207010 | A1 | | 11/2003 | Moon et al. |
| 2015/0245723 | A1 | * | 9/2015 | Alexander .............. F25B 21/04 |
| | | | | 99/483 |

\* cited by examiner

APPARATUS FOR ROASTING COFFEE BEANS

RELATED APPLICATIONS

This application claims priority under 35 U.S.C § 371 as a national stage application of PCT Application No. PCT/GB2018/000093, filed Jun. 7, 2018 which claims priority to GB 1705694.6 filed Apr. 7, 2017, each of which is hereby incorporated herein by reference in its entirety.

FIELD

The present invention relates, in one embodiment, to apparatus for roasting coffee beans.

BACKGROUND

Coffee is widely consumed throughout the world and whilst the coffee supply business is generally considered to be fairly lucrative, it is often the case that not all parties in the supply chain derive the same financial benefit.

In a typical supply chain, farmers (often in third world countries) grow and harvest coffee cherries. These cherries are then subjected to a number of processing operations that remove the flesh and a paper-like skin (known as "parchment") to leave raw coffee beans (otherwise known as "green" coffee beans). These beans are then sold for a relatively small amount of money to processing organisations (often in Europe or North America) that roast and grind the beans on a commercial scale. The processing organisations then sell the roasted beans and ground beans to retailers at a much inflated price, and the retailers then sell to the general public, again at a much increased price.

A problem with this arrangement is that farmers are often not fairly rewarded for their efforts, as the farmers will typically only receive a small percentage of the final sale price. Not only is this arrangement bad for the farmers, but it is also bad for consumers as they will typically have to pay much higher prices than if they had been able to source their coffee directly from the farmers, or even from the processors.

Another problem with this arrangement is that roasted coffee beans tend not to stay fresh for as long as green coffee beans, and as a consequence a consumer's cup of coffee is not as fresh as it would have been had the beans been kept in their unroasted "green" state until used. This problem is exacerbated when roasted coffee beans are ground, and to counteract this many manufacturers vacuum pack their ground coffee before supplying it to consumers. Whilst vacuum packing ground coffee does help to keep the coffee fresh, consumers can find that coffee quickly goes stale once the vacuum seal is broken.

To provide consumers with a fresher cup of coffee, we have previously proposed (in our European Patent No. EP2635141, for example) to provide roasting apparatus so that consumers can roast their own green coffee beans.

Whilst our previously proposed roaster functions adequately and addresses issues associated with other earlier devices (such as that disclosed in U.S. Pat. No. 5,185,171, for example), the relatively high temperatures (in the region of several hundred degrees centigrade—typically c. 300 degrees centigrade) at which beans are roasted can be problematic. With such temperatures the electronics required to control the device would either have to be relatively resilient, which increases the cost of manufacture, or sufficiently spaced from the heater, which increases the size of the appliance. It is also important to consider the safety issues associated with a table top appliance that is designed to operate at a relatively high temperature. Other factors to consider are the ease of assembly, as well as the complexity of the wiring required to interconnect components within the roaster.

The present invention has been devised with the foregoing issues in mind.

SUMMARY

In accordance with a presently preferred embodiment of the present invention, there is provided apparatus for roasting coffee beans, the apparatus comprising: a casing that defines an internal void, a baffle for dividing said internal void into first and second zones that are in fluid communication with one another; a heater for heating air to temperatures suitable for roasting coffee beans, said heater being located in said second zone; a control system for controlling the apparatus; said control system being located in said first zone; and a fan operable to draw ambient air into said first zone and drive said air from said first zone past said baffle into said second zone for heating by said heater, the arrangement being such that in use said first zone is cooler than said second zone.

An advantage of such an arrangement is that by locating the control system in the "cooler" first zone, it is not necessary for such components to be temperature resistant and the overall size of the apparatus can be reduced.

In one embodiment the fan is operable to drive air over said control system to cool said control system and thence into said second zone for heating by said heater. This arrangement further enhances cooling of the control system.

Preferably one or more hotter components of said apparatus located in said second zone are separated from said casing by means of spacers of a low thermal conductivity. Preferably the casing is of a material having a high thermal conductivity so that heat will tend to be drawn from said second zone to said first zone, thereby reducing the external temperature of said casing. These measures each help reduce the external temperature of the apparatus, and thus help reduce the risk of injury for anyone who might touch the casing whilst the apparatus is in operation.

In the preferred embodiment, the control system comprises a plurality of electronic components. The baffle may comprise a printed circuit board having a first face that lies in said first zone and a second face that lies in said second zone. In one implementation of the teachings of the invention the electronic components may be coupled to said first face of said printed circuit board. The heater may be coupled to said second face of said printed circuit board.

In preferred embodiments, the temperature in said first zone whilst the apparatus is being used to roast coffee beans is 60 degrees centigrade or less. Preferably the temperature in said second zone whilst the apparatus is being used to roast coffee beans is several hundreds of degrees centigrade, typically up to about three hundred degrees centigrade.

Preferably the fan is operable to drive air between the baffle and the casing from the first zone into the second zone. The fan may be operable to drive air through a circuitous path from said first zone to said second zone to thereby introduce perturbations in the airflow that promote mixing of heated air in said second zone.

In a preferred implementation the apparatus comprises a mixer that is operable to mix heated air. The mixer may comprise a plurality of vanes associated with, for example provided on, said heater.

Other preferred features of the present invention are set out hereafter.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Figure 1:
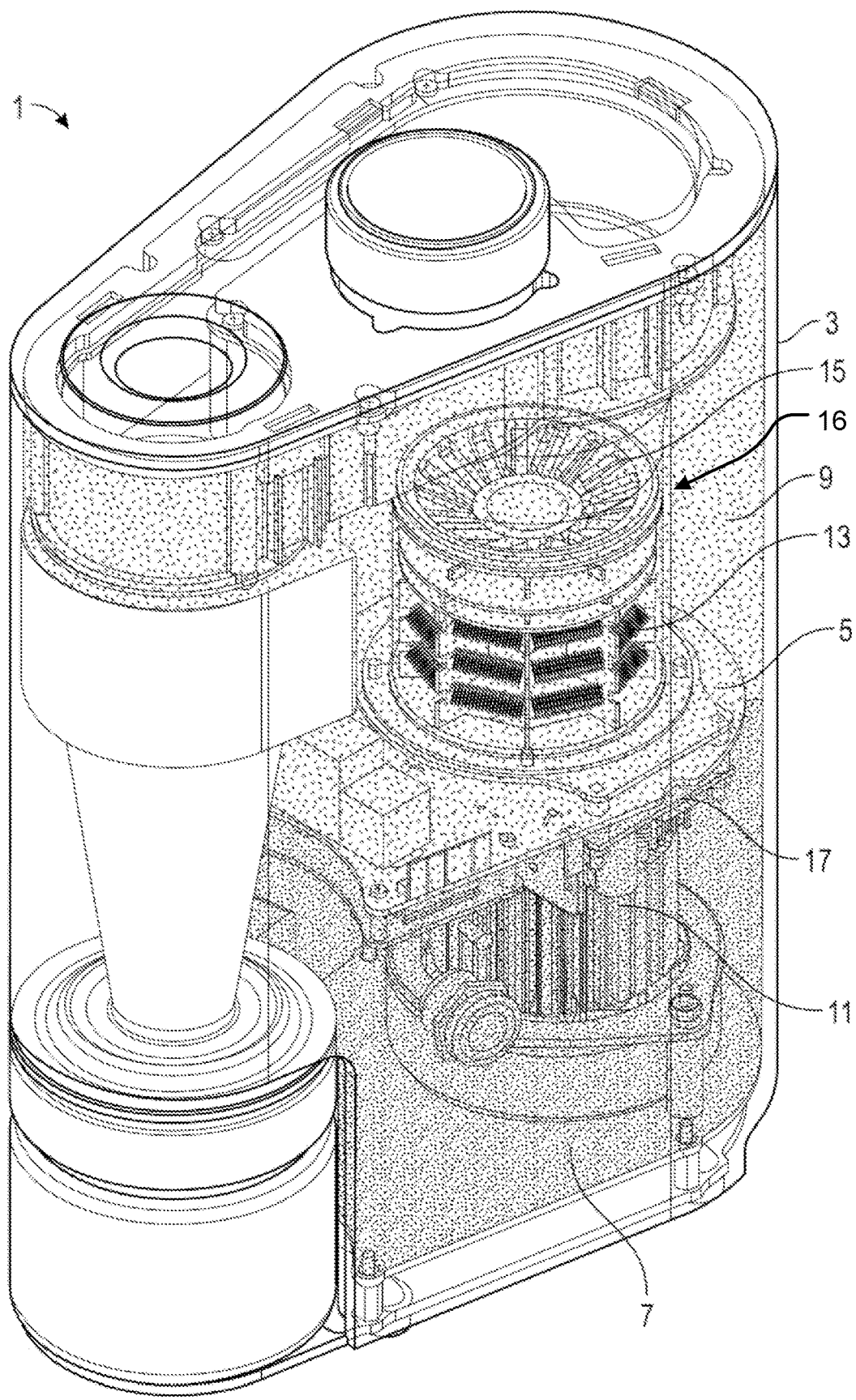
FIG. 1 is a schematic representation of a diagrammatic x-ray view of apparatus according to a preferred implementation of the teachings of the invention.

Referring now to the drawings, FIG. 1 is a diagrammatic x-ray view of apparatus 1 according to a presently preferred embodiment of the present invention. The apparatus depicted in FIG. 1 operates in a similar manner to the apparatus disclosed in our European Patent No. EP2635141 (the entire contents of which are incorporated herein by reference), and thus the manner in which the apparatus operates will not be further described herein.

The apparatus 1 comprises a casing 3 that defines an internal void within which components of the apparatus are located. The internal void is sub-divided by a baffle 5 into a first zone 7 and a second zone 9. The baffle has an area that is smaller than the lateral cross-sectional area of the internal void to thereby provide a gap through which air can pass from the first zone to the second. In a particularly preferred embodiment, the gap extends around substantially the entire periphery of the baffle.

A fan 11 is provided within the first zone 7 and is operable to draw ambient air into the first zone 7 of the apparatus through a vent (not shown) in the casing. The fan drives the air that has been drawn into the first zone through the gap between the baffle and the casing and into the second zone 9 of the internal void. Preferably the gap between the baffle and the casing is relatively small so that the air is accelerated as it is driven from the first zone into the second zone.

A heater 13 is provided within the second zone and is operable to heat the air that has been driven into the second zone (preferably to temperatures of up to about 300 degrees centigrade) before that heated air passes through a series of vents 15 in a roasting chamber to circulate and roast beans provided therein (as taught in our previously mentioned European Patent). In the preferred arrangement, the fan is operable to drive air into the second zone at a first rate to circulate beans whilst they are being roasted, and once they have been roasted at a second higher rate to lift the roasted beans up and out of the roasting chamber.

The apparatus includes a control system (designated generally by reference numeral 17) that includes a plurality of electronic components that are configured for operating the apparatus (such as a microcontroller, a motor for the fan 11, electronic components for powering the apparatus (in particular, the heater 13), electronic switches and the like).

Advantageously, in accordance with the teachings of the invention, the control system (or at least, those heat sensitive components of the system) is located within the first zone of the apparatus that is cooler in operation of the apparatus than the second zone in which the heater is located. By virtue of this arrangement, and additionally by virtue of the airflow driven over the control system, the components of the control system are kept sufficiently cool in operation of the apparatus that they need not be temperature resistant and can be closer to the heater, which helps reduce the size of the apparatus.

In this particular embodiment of the invention, the control system components are mounted on a first face of a printed circuit board that additionally functions as the aforementioned baffle, and the heater is mounted to the opposite second face of the same printed circuit board. This arrangement is particularly convenient, in the context of the internal wiring of the apparatus, as the heater can readily be coupled to the control system through the printed circuit board.

Whilst the aforementioned arrangement is the only one depicted in the drawings, it will be apparent to persons of ordinary skill in the art that the baffle need not comprise the printed circuit board to which the control system and/or the heater is/are coupled. For example, the control system could be coupled to a first circuit board in the first zone, a baffle could be provided between the first and second zones, and the heater could either be mounted to one side of the baffle in the second zone or mounted to another support in the second zone. All such embodiments provide the advantage that the control system can be located in a region of the casing that is cooler in use than that in which the heater is located, and thus the control system need not be comprised of more expensive temperature hardened components.

Figure 2:
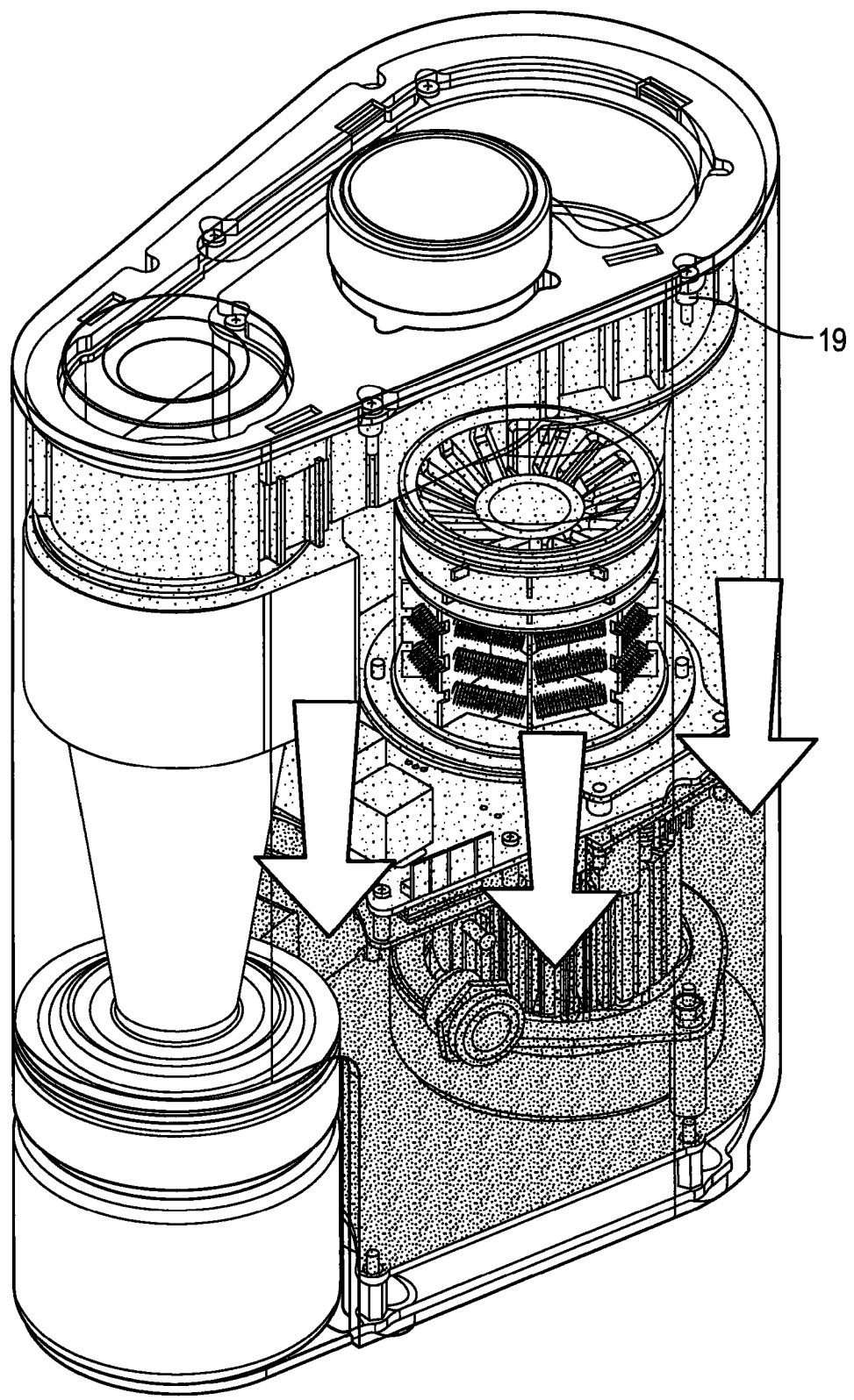
FIG. 2 is a schematic representation of temperature zones within the apparatus of FIG. 1 whilst it is in use.

Referring now to FIG. 2 of the drawings, in a preferred embodiment, the casing is of a material, such as a metal, that is a relatively good thermal conductor. With such an arrangement, heat generated in the aforementioned hotter second zone tends to be conducted through the casing towards the aforementioned cooler first zone (i.e. in the direction of the arrows shown in FIG. 2); and as a result the casing of the apparatus as a whole tends to be kept at a temperature that is unlikely to cause problems should someone touch it whilst the apparatus is operating.

To further enhance this aspect of the invention it is proposed that components within the second zone which will inevitably be relatively hot when the apparatus is operating (such as the aforementioned roasting chamber, for example) are thermally disconnected from the casing by means of spacers 19 inserted between the internal "hot" components and the casing. In one illustrative implementation of the teachings of the invention, the internal "hot" components are coupled to the casing (where necessary) by means of a coupling that includes a nylon spacer, which spacer functions to reduce thermal conduction of heat to the casing.

Figure 3:
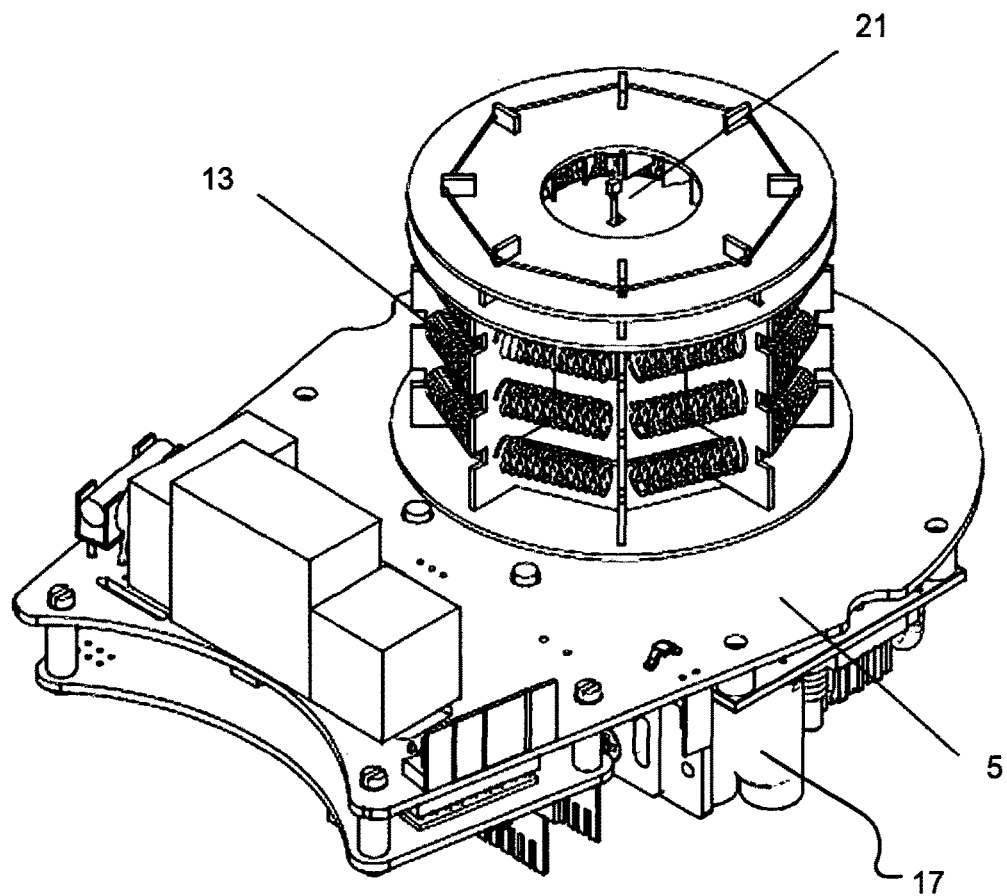
FIG. 3 is a schematic perspective view of a component of the preferred embodiment.
Figure 4:
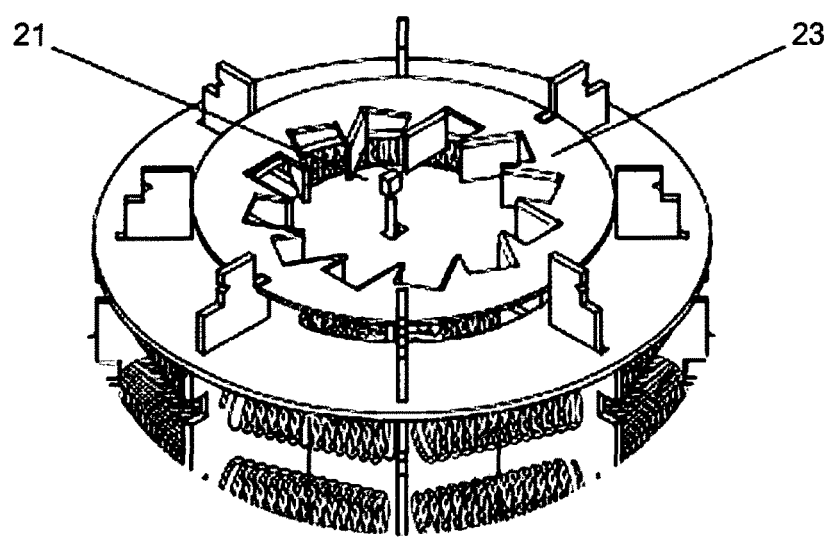
FIG. 4 is an enlarged view of part of a heating component for the apparatus depicted in FIGS. 1 to 3.

Referring now to FIG. 3, there is depicted a heater assembly comprising a baffle (in the form of a printed circuit board 5) having a first face on which a control system 17 is mounted, and an opposite second face to which the heater 13 is mounted.

The heater 13 is preferably an open coil heater through which air can flow. The heater includes a temperature sensor 21 (such as a thermistor, for example) that is located below the roasting chamber, and to improve reproducibility of a given bean roast it is preferred for the air entering the chamber via the vents 15 to be at substantially the same temperature. To this end, in a particularly preferred embodiment, the heater includes a plurality of vanes 23 that function to mix the heated air driven by the fan 11 so that the air entering the roasting chamber is of roughly a constant temperature.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst the foregoing description mentions the location of temperature sensitive control system components in the aforementioned first zone, it will be apparent to persons of ordinary skill in the art that any temperature sensitive component could be located within the first zone (irrespective of whether or not that component is of importance to the control of the apparatus). It is also the case, that whilst it is preferred for air to be driven around the periphery of the baffle (as such an arrangement introduces perturbations into the airflow to enhance mixing), air could be driven (alternatively or additionally) through the baffle from the first zone to the second.

It should also be noted that whilst the accompanying claims set out particular combinations of features described herein, the scope of the present invention is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. An apparatus for roasting coffee beans, the apparatus comprising:
   a casing that defines an internal void;
   a baffle for dividing said internal void into first and second zones that are in fluid communication with one another, said baffle comprising a printed circuit board having a first face that faces said first zone and a second face that faces said second zone;
   a heater coupled to said second face of said printed circuit board, said heater being operable to heat air to temperatures suitable for roasting said coffee beans, and a roasting chamber in which said coffee beans are circulated and roasted by air that has been heated by said heater, said roasting chamber and said heater being located in said second zone;
   a control system for controlling the apparatus, said control system comprising a plurality of electronic components and a fan motor located adjacent to one another and coupled to said first face of said printed circuit board so that said plurality of electronic components and the fan motor are located in said first zone; and
   a fan configured to be controlled via the fan motor and operable to: (i) draw ambient air into said first zone, (ii) blow air that has been drawn into said first zone over said plurality of electronic components of said control system to cool said control system, (iii) drive air that has been blown over said plurality of electronic components from said first zone past said baffle into said second zone for heating by said heater, and (iv) drive air that has been heated by said heater into said roasting chamber to circulate and roast said coffee beans, whereby said first zone is cooler than said second zone when the fan is in operation.

2. The apparatus according to claim 1, wherein the roasting chamber of said apparatus located in said second zone is separated from said casing by means of spacers of a low thermal conductivity.

3. The apparatus according to claim 1, wherein said casing is of a material having a high thermal conductivity to draw heat from said second zone to said first zone, thereby reducing an external temperature of said casing.

4. The apparatus according to claim 1, wherein a temperature in said first zone whilst the apparatus is being used to roast coffee beans is 60 degrees centigrade or less.

5. The apparatus according to claim 1, wherein a temperature in said second zone whilst the apparatus is being used to roast coffee beans is several hundreds of degrees centigrade.

6. The apparatus according to claim 5, wherein the temperature is about 300 degrees centigrade.

7. The apparatus according to claim 1, wherein the fan is operable to drive air between the baffle and the casing from the first zone into the second zone.

8. The apparatus according to claim 1, wherein the fan is operable to drive airflow through a circuitous path from said first zone to said second zone to thereby introduce perturbations in the airflow that promote mixing of heated air in said second zone.

9. The apparatus according to claim 1, comprising a mixer that is operable to mix heated air.

10. The apparatus according to claim 9, wherein said mixer comprises plurality of vanes provided on said heater.

11. An apparatus for roasting coffee beans, the apparatus comprising:
    a casing that defines an internal void;
    a baffle for dividing said internal void into first and second zones that are in fluid communication with one another, said second zone being above said first zone when the apparatus is orientated for use, said baffle comprising a printed circuit board having a first face that faces said first zone and a second face that faces said second zone, said baffle having an area that is smaller than a lateral cross-sectional area of the internal void to thereby provide a gap around the baffle between the baffle and the casing through which air can pass from said first zone to said second zone;
    a heater coupled to said second face of said printed circuit board, said heater being operable to heat air to temperatures suitable for roasting said coffee beans;
    a roasting chamber in which said coffee beans are circulated and roasted by air that has been heated by said heater, said roasting chamber and said heater being located in said second zone, said roasting chamber being separated from said casing by means of spacers of a low thermal conductivity;
    a control system for controlling the apparatus, said control system comprising a plurality of electronic components and a fan motor located adjacent to one another and coupled to said first face of said printed circuit board so that said plurality of electronic components and the fan motor are located in said first zone, said control system being connected to said heater through said printed circuit board; and
    a fan configured to be controlled via the fan motor and operable to: (i) draw ambient air into said first zone, (ii) blow the air that has been drawn into said first zone over said plurality of electronic components of said control system to cool said control system, (iii) drive the air that has been blown over said plurality of electronic components from said first zone past said baffle into said second zone for heating by said heater, and (iv) drive air that has been heated by said heater into said roasting chamber to circulate and roast said coffee beans, whereby said first zone is cooler than said second zone when the fan is in operation, and said casing is of a material having a high thermal conductivity to draw heat from said second zone to said first zone, thereby reducing an external temperature of said casing.

\* \* \* \* \*